United States Patent
Mola

(10) Patent No.: US 10,445,216 B2
(45) Date of Patent: Oct. 15, 2019

(54) DEBUGGING PROGRAM CODE AT INSTRUCTION LEVEL THROUGH EMULATION

(71) Applicant: Microsoft Technology Licensing, LLC, Redmond, WA (US)

(72) Inventor: Jordi Mola, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 8 days.

(21) Appl. No.: 15/686,672

(22) Filed: Aug. 25, 2017

(65) Prior Publication Data
US 2019/0065347 A1    Feb. 28, 2019

(51) Int. Cl.
  G06F 9/44    (2018.01)
  G06F 11/36   (2006.01)
  G06F 8/70    (2018.01)

(52) U.S. Cl.
  CPC ............ G06F 11/3644 (2013.01); G06F 8/70 (2013.01); G06F 11/3636 (2013.01); G06F 11/3652 (2013.01); G06F 11/3664 (2013.01)

(58) Field of Classification Search
  CPC .... G06F 11/3664; G06F 9/455; G06F 11/261; G06F 17/5009; G06F 11/3457; G06F 9/45508
  See application file for complete search history.

(56) References Cited

U.S. PATENT DOCUMENTS

| | | | |
|---|---|---|---|
| 6,119,206 A | 9/2000 | Tatkar et al. | |
| 6,553,565 B2 | 4/2003 | Click, Jr. et al. | |
| 7,472,310 B2 | 12/2008 | Ueda | |
| 7,823,033 B2 | 10/2010 | Moyer et al. | |
| 8,499,285 B2 | 7/2013 | Schneider | |
| 8,713,547 B2 | 4/2014 | Gschwind et al. | |
| 9,122,792 B2 | 9/2015 | Bates et al. | |
| 2002/0196678 A1 | 12/2002 | Haber et al. | |

(Continued)

FOREIGN PATENT DOCUMENTS

WO    9714096 A1    4/1997

OTHER PUBLICATIONS

Chia-Heng Tu et al., Performance and Power Profiling for Emulated Android Systems, ACM, 2014, retrieved online on Jun. 9, 2019, pp. 1-25. Retrieved from the Internet: <URL: http://delivery.acm.org/10.1145/2570000/2566660/a10-tu.pdf?>. (Year: 2014).*

(Continued)

*Primary Examiner* — Hanh Thi-Minh Bui
(74) *Attorney, Agent, or Firm* — Workman Nydegger

(57) ABSTRACT

Methods and systems are disclosed for debugging program code at instruction level by emulating an epilog. Issues with retrieving values that a caller function has stored in non-volatile registers before calling a callee function are addressed at the instruction code level by through emulation. The epilog of the callee function may be emulated after copying a computing environment of the target program code from a target system to an emulation system. When the debugged code does not include an epilog, values that a caller function stored before calling a callee function in non-volatile registers may be retrieved by emulating the calling function forward from the breakpoint.

20 Claims, 13 Drawing Sheets

(56) References Cited

U.S. PATENT DOCUMENTS

| | | | |
|---|---|---|---|
| 2003/0016237 A1* | 1/2003 | Hickey | G06F 16/25 715/700 |
| 2004/0205062 A1* | 10/2004 | Brown | G06F 16/24532 |
| 2010/0095281 A1 | 4/2010 | Raber | |
| 2010/0162217 A1 | 6/2010 | Morrison | |
| 2012/0266144 A1 | 10/2012 | Halliday et al. | |
| 2014/0337255 A1* | 11/2014 | Eads | G06N 5/02 706/12 |

OTHER PUBLICATIONS

"International Search Report and Written Opinion Issued in PCT Application No. PCT/US2018/038385", dated Oct. 2, 2018, 13 Pages.

\* cited by examiner

DEBUGGING PROGRAM CODE AT INSTRUCTION LEVEL THROUGH EMULATION

BACKGROUND

Use of debugger application programs to analyze and resolve bugs in program code has become commonplace in computer system device and application development. A debugger typically controls execution of target program code that is subject to analysis, traces uses of computing resources such as, but not limited to, main memory, registers, and memory stacks as well as program instruction code being executed. The debuggers may start, suspend, resume and stop program code execution, and provide addresses and values of data stored in the computing resources. Some debuggers may provide a set of values of data in various memory locations upon suspending program code execution at various break points as snapshots of the computing environment such as values that are currently stored in registers as the current function is at a break point. In addition to providing values of the current registers and memory stack, it may also be desirable for debuggers to provide data associated with one or more caller functions of the current function, to provide information that is useful to understand about various parameters before or after the current function call.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues may be resolved by the emulation and unwinding of code. program code such as an epilog of function calls in the stack between the frames to provide values of data in non-volatile registers. Non-volatile registers are registers that the caller knows that will have the exact same value before the call to a callee function as after the call to the callee function. In some instances, that is because the callee function will take care of either not modifying values stored in non-volatile registers or persist the values somehow to recover them before returning. For instance, to retrieve values of data that a caller function has placed into a non-volatile register prior to calling a callee function, the aspects disclosed herein may locate and emulate a set of instruction code to restore values of data in the non-volatile registers. In aspects, a computer-implemented method for debugging executable code is provided. The method includes executing the executable code, stopping execution of the executable code at a current function, locating an instruction code segment of the current function, and emulating the instruction code segment. After emulating the instruction code segment, the method further comprises retrieving at least one value of non-volatile registers for a caller function of the current function, where the instruction code segment modifies at least one value of non-volatile registers, and providing the at least one value of a non-volatile registers for the caller function.

In further aspects, a computing device including at least one processing unit and memory is provided. The memory stores computer executable instructions for debugging program code at the instruction level. Execution of the instructions by at least one processing unit causes the computing device to perform one or more operations to execute the code, stop execution of the code at a current function, locate an instruction code segment of the current function, and emulate the instruction code segment. After emulating the instruction code segment, the at least one value of non-volatile registers for a caller function of the current function may be retrieved from non-volatile registers associated with the emulated code.

In still further aspects, a computer storage device is provided. The computer storage device stores computer executable instructions for debugging code at the instruction level, the instructions, when executed by at least one processing unit, cause the at least one processing unit to execute the code, stop execution of the code at a current function, locate an instruction code segment of the current function, and emulate the instruction code segment. After emulating the instruction code segment, the at least one value of non-volatile registers for a caller function of the current function may be retrieved from non-volatile registers associated with the emulated code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1A:
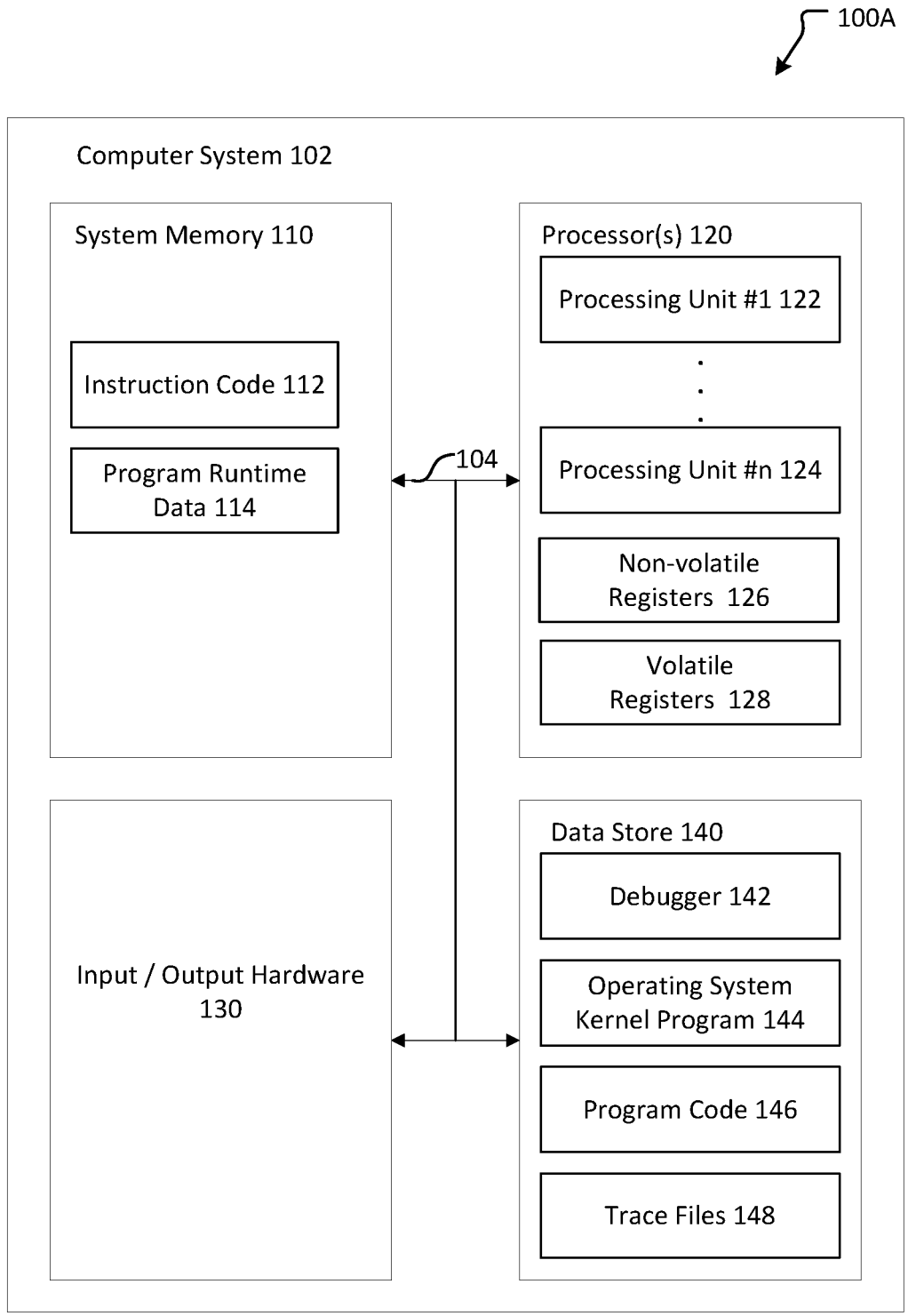
FIGS. 1A-1B illustrate an overview of an example system for debugging.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure provides systems and methods for debugging program code by emulating epilog code. Use of debugger application programs have become a commonplace in computer systems and devices development. At the same time, a rapid advancement in the processing performance of computers and operating systems has resulted in making the debugging process more complex and difficult. For instance, recent types of processors may be capable of processing using at least 64-bit registers, and accordingly managing the larger registers has become more complex. In addition, compilers of program code have evolved to generate instruction code that are highly optimized for the advance processors. As a result, the inclusion of more advanced features in debugger application programs may be desirable. For instance, conventional debuggers may provide a set of values of data and addresses on registers, stacks and heap memory as a snapshot when a program code execution is suspended at a break point. The conventional debuggers may provide such information with references to program code symbols for easier analysis of the program code at that break point in some specific function call.

However, when debugging computer systems, applications, and devices, more information may be needed to accurately assess issues at hand. For instance, in addition to information associated with data used by the current (callee) function, information about a caller function that called the current function may be required to accurately understand the behavior of the callee function. Typically, debuggers may provide parameter values received by the callee (i.e., the current function where the execution has stopped) as these values are part of executing the current function call. However, the debuggers may face difficulty providing values that were used by the caller function before calling the callee function. In some aspects, a caller function may store data in non-volatile registers where persistency of the data may be guaranteed by a calling convention when the callee function returns. The calling convention may be specified by Application Binary Interface (ABI) which sets standard conventions that impose requirements upon functions comply, in order to enable the functions to call each other. ABI complies with rules as specified by processors. In some cases, functions may use a standard calling convention, while some other functions may use a custom calling convention within the bounds of the ABI. However, optimized instruction code may temporarily store data in the non-volatile registers in the memory stack as the callee function starts, and restore the data just before the callee function returns to the caller function. The caller function would not be impacted by the temporary change in storage place, as long as the callee function refers data while the function is executed. The issue may arise when the debugger stops inside the callee function, where the data in non-volatile register has already been temporarily moved to the memory stack. Some debuggers and developers may just wrongly assume that data set by the caller function in the non-volatile registers before calling the callee function remain the same throughout the time that the callee function is being executed. That may not be the case, depending on how program instruction code are optimized by compilers for the processor. As a result, some debuggers may provide values that are inaccurate by simply presenting values from the non-volatile registers.

Reasons for such a difficulty in providing information associated with the caller function may include but not limited to how registers and stacks may be used while the callee function is executed. For example, registers may consist of volatile and non-volatile registers. There may be caller-persistent registers and callee-persistent registers, where some of registers retain values set by a caller function unchanged throughout the execution of the caller function, and some other registers may be changed by callee function. According to some calling conventions, a caller function is responsible for guaranteeing volatile registers, while a callee function is responsible for guaranteeing non-volatile registers. That is, a callee function guarantees any value that a caller function has set in non-volatile registers before the caller function calls the callee function.

An ABI may depend on various aspects of computing environment such as, but not limited to, processors and operating systems. For example, the ABI may depend on the processor architecture and/or the instruction set associated with the processor (e.g., x86, ARM, etc.). The ABI determines how functions interface each other at instruction code level while optimizing code for the processor under specific modes of execution such as, but not limited to, 32-bit and 64-bit modes. In some aspects, the calling convention is obtained via mechanisms defined by ABI. The calling convention may differ for respective functions, even within a single binary image or module for the functions. Compilers may compile program code into instruction code according to the ABI. As a result of the optimizations to the instruction code for more efficient execution, the callee function may not guarantee the values in the non-volatile registers for the caller function until the moment that the callee function returns to the caller function. That is, the callee function may load the non-volatile registers with different values during execution and restore the caller function values to the non-volatile registers upon completion of execution. In some optimized code, values set by the caller function in non-volatile registers may be moved to other locations such as memory spaces in a memory stack while the callee function is executed, and these values may then be put back to the original non-volatile registers just before the callee function returns to the caller function. Upon returning from the callee function, the compiler restores the values as a part of code optimization, which is not apparent from the original program code for the caller function and the callee function. It is often desirable for the debuggers to provide values of data that caller function has set in non-volatile registers before invoking the callee function. In some cases, values of data in volatile registers used by a function may be recreated by emulating the function by using values stored in non-volatile registers.

In analyzing values associated with the caller function while debugging at a break point within the callee function code, however, there may be no guarantee that the values in the non-volatile registers set by the caller function are accurate because a context of execution is on the callee function, not on the caller function, before returning to the caller function. The issue in tracing code may become more complex when there is multiple caller functions to trace back in the hierarchy of function calls. In particular, values stored in non-volatile registers while the callee function is being executed may differ from the values that the caller function has set before calling the callee function until the callee function returns. Simply referring to values stored in the non-volatile registers before the callee function returns by assuming persistence of the values may lead the debugger to an incorrect results.

In some aspects of the present disclosure, prologs and epilogs of functions may be emulated to retrieve values of data that has been stored in non-volatile memory by caller functions. ABI may provide prologs and epilogs in specific segments of instruction code for functions. Compilers may generate such segments during compiling program code to produce instruction code for execution.

FIG. 1A illustrates an example computing environment 100A that facilitates logging of a trace data related to program code execution using a set of cache lines. As depicted, aspects of the present disclosure may comprise or utilize a special-purpose or general-purpose computer system 102 that includes components of computer hardware, such as, for example, system memory 110, one or more processors 120, input/output hardware 130, and/or one or more data stores 140, and/or. These components may be connected by a data bus 104, enabling moving and copying of instructions and data among components.

Aspects within the scope of the present disclosure may include physical and other computer-readable media for carrying or storing computer-executable instructions and/or data structures. Such computer-readable media may be accessed by the computer system 102. AS an example, computer-readable media that stores computer-executable instructions and/or data structures may be non-transitory computer storage devices. Computer-readable media may also include communication media may be used transmit computer-executable instructions and/or data structures. Thus, by way of example, and not limitation, aspects of the disclosure may comprise at least two distinctly different kinds of computer-readable media: non-transitory computer storage devices and communication media. In the recited examples, computer storage devices do not consist of non-transitory signals or carrier waves. Furthermore, computer storage devices do not consist of communication media. As used herein, the term "statutory computer-readable media" includes only statutorily allowable computer readable media. Statutory computer-readable media does not include any non-statutory computer readable media.

Computer storage devices may be non-transitory hardware devices that store computer-executable instructions and/or data structures. Computer storage devices may include various computer hardware, such as RAM, ROM, EEPROM, solid state drives ("SSDs"), flash memory, phase-change memory ("PCM"), optical disk storage, magnetic disk storage or other magnetic storage devices, or other hardware device(s) which may be used to store program code in the form of computer-executable instructions or data structures, and which may be accessed and executed by the computer system 102 to perform the disclosed functionality of the disclosure. Thus, for example, computer storage devices may include the depicted system memory 110 and the depicted data store 140 that may store computer-executable instructions and/or data structures, and/or other storage such as on-processor storage, as discussed later.

Communication media may include a network and/or data links which may be used to carry program code in the form of computer-executable instructions or data structures, and which may be accessed by the computer system 102. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer system, the computer system may view the connection as communication media. Combinations of the above may also be included within the scope of computer-readable media. For example, the input/output hardware 130 may comprise hardware (e.g., a network interface module (e.g., a "NIC")) that connects a network and/or data link, which may be used to carry program code in the form of computer-executable instructions or data structures.

Further, upon reaching various computer system components, program code in the form of computer-executable instructions or data structures may be transferred automatically from communication media to computer storage devices (or vice versa). For example, computer-executable instructions or data structures received over a network or data link may be buffered in RAM within a network interface controller (NIC) (e.g., input/output hardware 130), and then eventually transferred to the system memory 110 and/or to non-volatile computer storage devices (e.g., data store 140) at the computer system 102. Thus, it should be understood that computer storage devices may be included in computer system components that also (or even primarily) utilize transmission media.

Computer-executable instructions may comprise, for example, instructions and data which, when executed by the processor(s) 120, may cause the computer system 102 to perform a certain operation or group of operations. Computer-executable instructions may be, for example, binaries, intermediate format instructions such as assembly language, or even source code.

As illustrated, the data store 140 may store computer-executable instructions and/or data structures representing application programs such as, for example, a debugger 142, an operating system kernel program 144, and program code 146 (e.g., the application that is the subject of debugging by the debugger 142, and one or more trace file(s) 148). When these programs are executing, e.g., using the processor(s) 120, the system memory 110 may store corresponding runtime data, such as runtime data structures, computer-executable instructions, etc. Thus, FIG. 1 illustrates the system memory 110 as including instruction code 112 and program runtime data 114 (e.g., corresponding with application program 146).

The debugger 142 may be operable to debug execution of an application, such as program code 146, and to log trace data in the trace file 148. In some aspects, the debugger 142 may be a standalone application, while in other aspects the debugger 142 may be integrated into another software component, such as the operating system kernel program 164, a hypervisor, etc. While the trace file 148 may be depicted as being stored in the data store a 140, the trace file 148 may also be recorded exclusively or temporarily in the system memory 110, or at some other storage device.

FIG. 1 depicts a simplified representation of the internal hardware components of the processor 120. As illustrated, at least one processor 120 may include a plurality of processing units (122 and 124). A processing unit may be physical (i.e., a physical processor core) and/or logical (i.e., a logical core presented by a physical core that supports hyper-threading, in which more than one application thread executes at the physical core). Thus, for example, even though the processor 120 may, in some embodiments, include only a single physical processing unit (core), it may include two or more processing units (such as 122 and 124) presented by that single physical processing unit.

A processing unit (such as 122 and 124) may execute instructions that are defined by programs, such as but not limited to, debugger 142, operating system kernel program 144, and program code 146. The instructions may be selected according to a predefined processor instruction set architecture. The particular instruction set architecture of a processor 120 may vary based on processor manufacturer and processor model. Common instruction set architectures may be defined according to various architectures of processor chipsets. In general, an "instruction" may be a small, externally-visible (i.e., external to the processor) unit of code that is executable by a processor.

Non-volatile registers 126 may include one or more registers that stores persistent data. Instruction code 112 may use the non-volatile registers 126 to store data needed during its execution. In particular, the instruction code 112 may store data that need to be preserved over functions that the current function may call. In some aspects, a caller function may store data in non-volatile registers before calling a callee function; the caller function then recovers the data after the callee function returns and processing of the caller function resumes. Volatile registers 128 may include one or more registers that do not preserve data over the callee functions. As registers are scarce resources for storing memory in the processor 120, instruction code that are highly optimized for the processor 120 may use data in the non-volatile registers 126 while executing the callee function by temporarily moving the data in the non-volatile registers 126 to memory stack in System Memory 110 as the callee function starts, and restore the data in the non-volatile registers just before the callee function returns to the caller function.

A processing unit 122 may also include non-volatile registers 126 and volatile registers 128, which comprise a set of memory units for use by the processor 120, and which generally functions as non-volatile or volatile memory storage on the hardware of the processor and the processor instruction set architecture exposed by the processor 120 to executing applications.

As should be appreciated, the various methods, devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 1B:
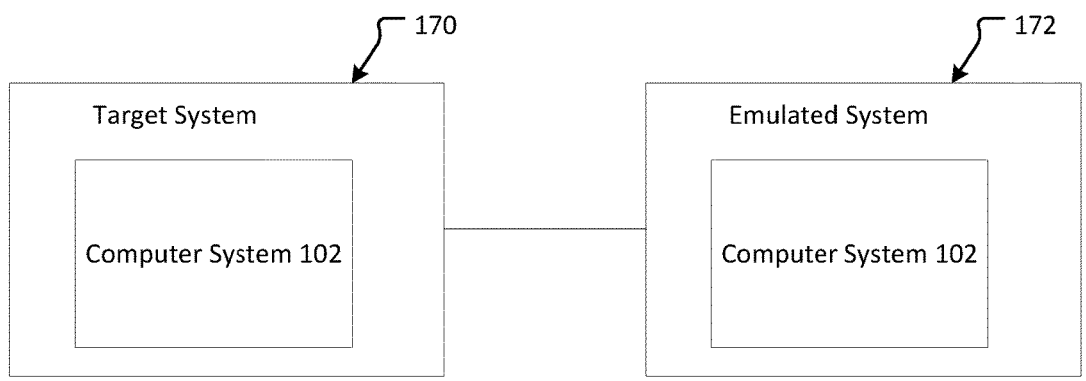

FIG. 1B provides exemplary systems that are configured for debugging. For instance, there may be a target system 170 and an emulated system 172. The target system 170 may be the system executing the code that is being debugged. The target system 170 may be the system from which values of non-volatile registers for caller functions may be retrieved. In some aspects, information about executing program code in the target system 170 may be copied to the emulated system 172 when the debugger 142 suspends execution of the program code by the target system 170. Then, values of non-volatile registers used by caller functions may be retrieved according to some aspects of the present disclosure. By copying the information about program execution from the target system 170 to the emulated system 172 for emulation, emulations can be repeated by resetting the emulation environment by copying the information again from the targets system 170.

As should be appreciated, the various methods, devices, components, etc., described with respect to FIG. 1 are not intended to limit the systems and methods to the particular components described. Accordingly, additional topology configurations may be used to practice the methods and systems disclosed herein and/or some components described may be excluded without departing from the various aspects disclosed herein.

Figure 2:
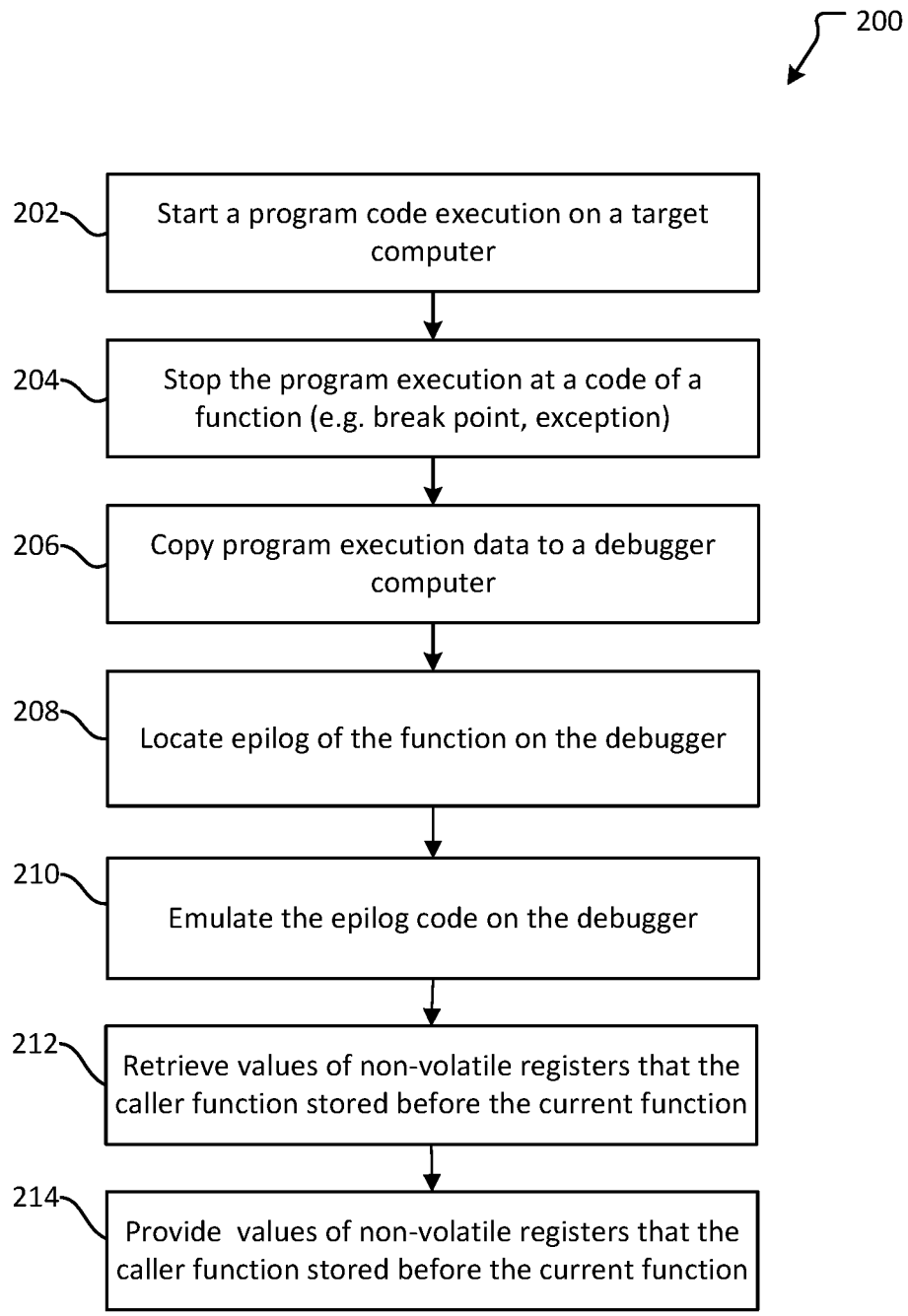
FIG. 2 illustrates a method of retrieving values of non-volatile registers while debugging.

FIG. 2 illustrates a method for retrieving values of data stored by a caller function in non-volatile registers prior to calling a callee function. In one example, the method 200 relates to a system that comprises a target computer and an emulated system that is an emulator for debugging. The target computer may be the computer that application program code is executed by setting breakpoints. The target computer may comprise a computing environment of actual deployment in use. Trace data while the program code execution may be logged on the target computer. On the other hand, the emulated system may be used for emulating the application program code by probing data in non-volatile registers 126, volatile registers 128 as well as system memory 110 of computer system 102 within the emulated system. At operation 202, the execution of program code may be performed on a target computer. For instance, execution of a program code on the target system, such as target system 170 of FIG. 1B, may be initiated by a debugger 142. Upon execution, the program code, such as shown as program code 146 in FIG. 1A, may be loaded onto system memory 110 as instruction code 112. As the program code is executed, program runtime data 114 may be generated. Depending on the instruction code 112, a processor of the target computing system 120 may read, write and modify data in non-volatile registers and in volatile registers.

At a stop operation 204, execution of the program code may be stopped at a location or an instruction specified by debugger software. For instance, the execution of the program code on the target system 170 of FIG. 1B may be stopped by the debugger, such as, debugger 142 of FIG. 1A. In some aspects, an exact location in the instruction code or the corresponding program code may be specified using a break point set by the debugger. When the execution is stopped, data in various parts of system memory and processor, such as but not limited to, program runtime data and instruction code in non-volatile registers and volatile registers, may be retrieved as a snapshot of the computing environment in the target system executing the program code.

At copy operation 206, data related to program code execution on the target system may be copied to the emulated system. The emulated system may reside on the same device as the target system or on a remote device. The copy operation may be executed by through communications between the debugger 142 in the target system 170 of FIG. 1B and in the emulated system. Alternatively, the copy operation may be executed by the debugger in 142 by accessing the computing resources in the target system 170 of FIG. 1B from the emulated system 172 of FIG. 1B. In some aspects, information required to emulate execution of the program code may be copied. For instance, data may include data in various parts of system memory and processor, such as but not limited to program runtime data and instruction code in system memory and data stored in the non-volatile registers and volatile registers in the target system's processor(s).

At locating operation 208, an epilog of the callee function may be located on the emulated system by the debugger. In some aspects, ABI may provide prologs and epilogs for functions in their respective instruction code, which may be optimized for processors. In some aspects, prologs may be a set of program instruction code that are executed at the beginning of a function when the function is called by a caller function, before a main code section of the function is executed. In particular, prologs may prepare computing environment such as memory registers and stack pointers as the callee function starts to execute. If the program instruction code is optimized for the processor by utilizing non-volatile registers for the callee function execution, the prolog moves data in the non-volatile registers to the memory stack so that the non-volatile registers become available for the callee function to use. In some aspects, epilogs may be a set of program instruction code that are executed just before the callee function returns to the caller function. In some aspects, epilog code may de allocates the fixed stack allocation that has been used by the callee function, restores non-volatile registers from saved locations where the prolog code moved to just before the callee function started, and returns to the caller function. In some aspects, prologs and epilogs mirror in its processing: a prolog "winds" and an epilog "unwinds." Prologs and epilogs may correspond to respective segments of instruction code of a function. Typically, an instruction code for a function may have one prolog and at least one epilog. However, in some instances, more than one prolog and/or epilog may be associated with a function.

In some aspects, a prolog section of the instruction code of a callee function may be executed at some time between the time that a caller function calls the callee function and the time that any part other than the prolog section of the callee function is executed. Among a variety of processing done in a prolog, a prolog code may prepare a computing environment for the callee function code to be executed by ensuring that responsibilities of the callee function as defined by ABI are appropriately satisfied while the code is optimized for processing performance. For instance, a prolog section of instruction code may move data stored by a caller function in non-volatile registers to the memory stack, thereby making the non-volatile registers available for the callee function to use during its function execution.

In some aspects, an epilog of a function may be a specific segment of instruction code for a function, which may be executed at some time between the time after any part other than the epilog section of the callee function is executed and the time that the callee function returns to the caller function. As a counter-part to a prolog, epilog code may be inserted by a compiler when a set of instruction code is generated from a program code. The prolog code and the epilog code may mirror each other. In addition to other functionality provided by the epilog, the epilog code may prepare a computing environment for the caller function code to resume execution by ensuring that responsibilities of the callee function as defined by ABI are appropriately satisfied in accordance with compiler optimizations. For instance, an epilog section of instruction code may move the data stored by the prolog in the memory stack to appropriate non-volatile registers where the data was originally placed by the caller function. This way, the data values stored in non-volatile registers by the caller function may be intact when the callee function returns to the caller function.

In some aspects, there may be more than one epilog for the callee function. For instance, there may be more than one epilog in a callee function when there are more than one try-catch blocks to catch exceptions during code execution. In such a case, instruction code indicating that the debugger is in a particular try-catch block may be referenced to identify which epilog to emulate.

In an execute operation 210, the located epilog may be executed using on the emulated system. Emulation of the epilog unwinds any changes made by the callee function and restores any non-volatile registers to the state that they were in at the time that the caller function called the callee function. Because the unwinding is performed using the emulated system, the state of the application program being debug is correctly maintained. Upon completion of executing epilog, all the data that the caller function has stored in non-volatile registers may be restored.

At a retrieve operation 212, values of the emulated non-volatile registers may be retrieved by the debugger for further use. For instance, the retrieved values may be provided by the debugger use when analyzing the state of the caller function before calling the callee function.

At a provide operation 214, the values of the non-volatile registers may be provided by the debugger for further analysis of the caller function. For instance, the caller functions may continue to be emulated based on the values from the point of the code where the call to the callee function returns to the caller function. Additionally or alternatively, values of parameters that are stored in volatile registers may be generated based on the program instruction code of the caller function along with the values of the non-volatile registers as provided. In some aspects, values of data that may be stored in volatile registers, stacks and other memory may be generated by re-executing, using the emulated system, appropriate sections of instruction code in various functions by using data that are stored by the function in non-volatile registers.

As should be appreciated, operations 202-212 are described for purposes of illustrating the present methods and systems and are not intended to limit the disclosure to a particular sequence of operations, e.g., operations may be performed in differing order, additional or fewer operations may be performed, and some of the disclosed operations may not be performed without departing from the present disclosure.

Figure 3:
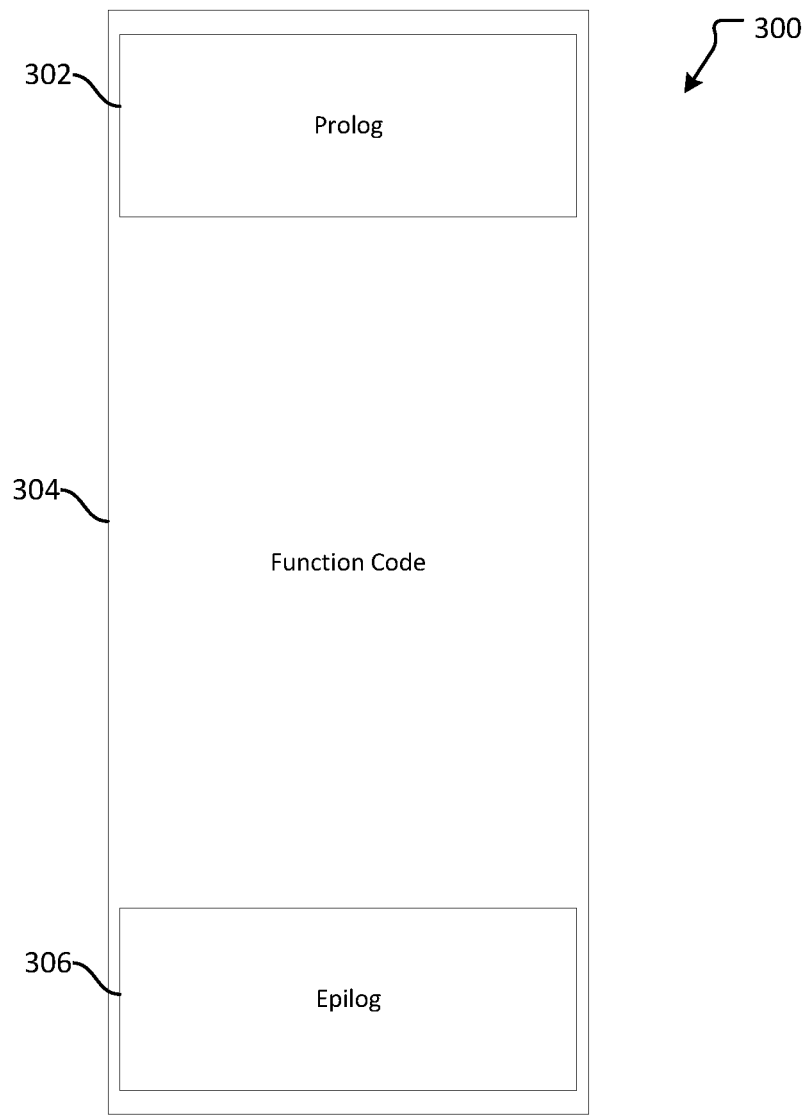
FIG. 3 illustrates an overview of a function code with a prolog and an epilog.

FIG. 3 illustrates an exemplar overview of an instruction code for a function with a prolog and an epilog. An instruction code 304 of a function may be generated by a compiler based on a program code of a function. The compiler may be refined to generate an instruction code that is highly optimized for specific processors to execute at high performance by leveraging characteristics and features of the processors in a computer system. In some aspects, the instruction code 304 may comprise prolog 302, a function code (body) and an epilog 306. Both the prolog 302 and the epilog 306 may be generated and inserted by the compiler during a compilation of the original program code.

In some aspects, a prolog 302 may contain instruction code to prepare a computing environment for the function code to be executed at optimum performance for the processor. For instance, the prolog 302 may maximize a number of registers available for executing the function code by relocating data that may be stored in one or more non-volatile registers to a memory stack.

In some aspects, an epilog 306 may contain instruction code to restore a computing environment for the caller function to resume executing after returning from the callee function to the caller function. The epilog 306 may reverse or "unwind" the processing done by the prolog 302. Some ABI may require specific sequences of relocating and restoring values in non-volatile registers in the prolog 302 and the epilog 306. Compilers may ensure that all the requirements as set forth by the ABI are satisfied in instruction code that the compiler generates based on the original program code. In some aspects, instruction code for the epilog 306 may be located at the bottom of the memory stack for the function. In some other aspects, a debugger may identify an appropriate epilog 306 when there are more than one epilogs in the instruction code for a function code by referring to instruction code that relate to a specific try-catch block.

As should be appreciated, the exemplary structure described with respect to FIG. 3 is not intended to limit the systems and methods disclosed herein to the particular structure described. Accordingly, additional configurations may be used to practice the methods and systems herein and/or some components described may be excluded without departing from the methods and systems disclosed herein.

Figure 4:
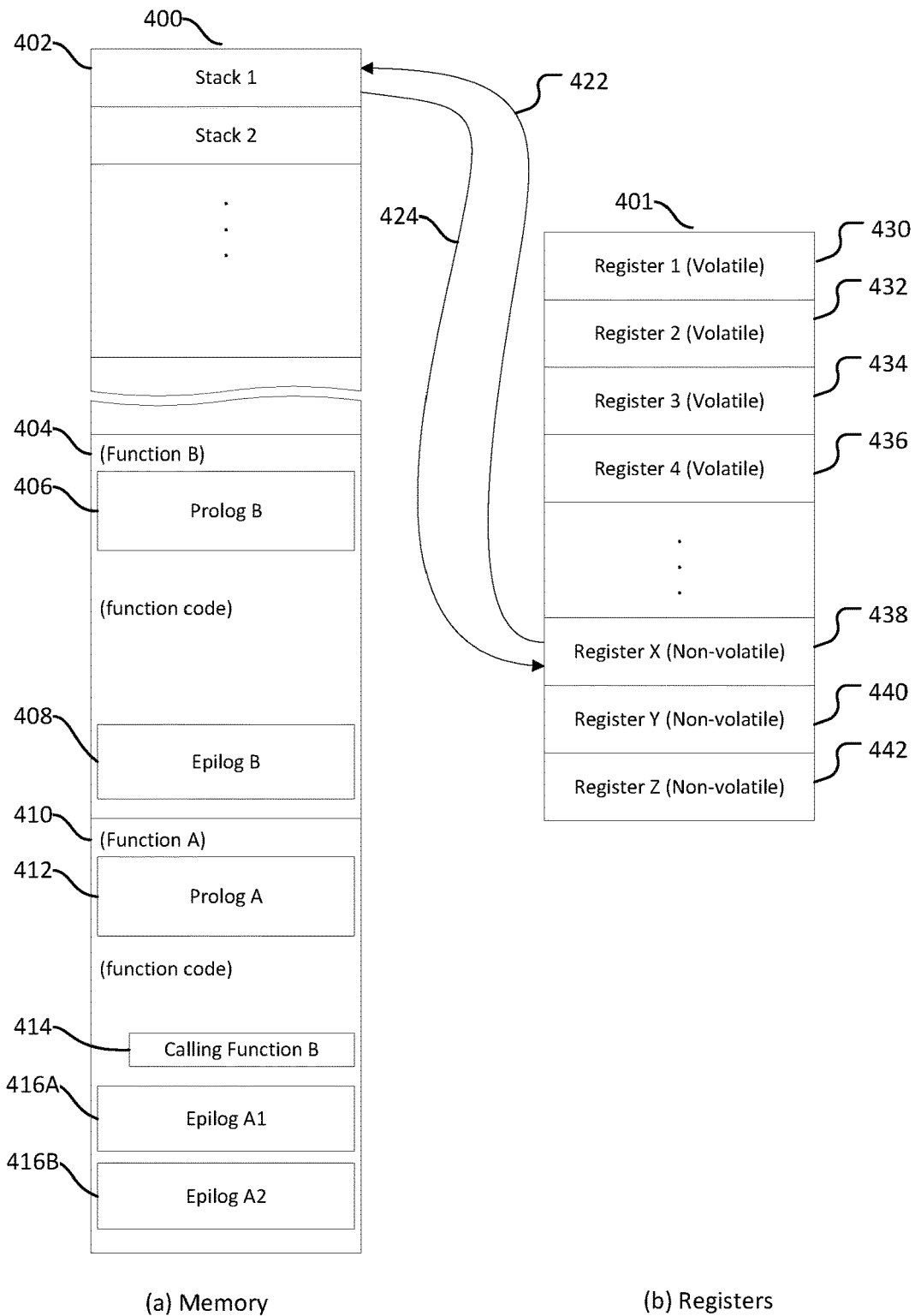
FIG. 4 illustrates an example of program instruction code and data in memory and registers.

FIG. 4 illustrates an example of program instruction code and data in memory and in registers. FIG. 4 illustrates main memory map 400 and registers 401. In some aspects, the main memory may be located outside the processor 120 while the registers may be located inside processors. Access speed to respective memory space may be drastically different between accessing the main memory and the registers. Access to registers may be much faster.

In some aspects, memory 400 may correspond to system memory 110 in FIG. 1A. The memory 400 may contain instruction code 112 and program runtime data 114. FIG. 4 illustrates as an example where a function A 410 may be executed first, and then a function code within the function A 410 may call a function B 404. The example in FIG. 4 may indicate a memory layout when a debugger stopped execution of the program code as the function B is being executed. Accordingly, the function A is a caller function while the function B is a callee function with a breakpoint, which is not shown.

FIG. 4 also illustrates an exemplar set of registers. There may be multiple registers, from Register 1 through Register Z (e.g., shown as registers 430, 432, 434, 436, 438, 440, and 442). Among the registers, Registers 1 through 4 may be volatile registers, while Registers X through Z may be non-volatile registers. According to some calling conventions, a caller function is responsible for guaranteeing volatile registers, while a callee function is responsible for guaranteeing non-volatile registers. That is, a callee function guarantees any value that a caller function has set in non-volatile registers before the caller function calls the callee function.

According to the example, Function A 410 may be executed, and Function B 404 may be called by the Function A 410 (i.e., shown at 414). Instruction code for Function A 410 may be located in memory 400, and prolog A 412. In some aspects, Function A 410 may have two epilogs: Epilog A1 416A and Epilog A2 416B. Function B may be called from within the function code of Function A 410. Instruction code for Function B 404 may be loaded to the memory, including prolog B 406 and epilog B 408 for the Function B 404. In the memory 400, data for the memory stack 402 may be stored.

According to an example shown in FIG. 4, instruction code for Function A 410 may store data in non-volatile register Register X 438. In accordance to rules set forth by ABI, the callee function (Function B 404) must ensure that a data value of Register X is restored when Function B 404 returns to the caller function (Function A 410).

As shown in FIG. 4, Prolog B 406 of Function B 404 may relocate a value in Register X (non-volatile register) to Stack 1 of the memory stack 402, as indicated by the unidirectional arrow 422. It may be the responsibility of the callee function Function B 404 to restore the value of Register X (non-volatile register) 438 before the call returns to Function A 410 (i.e., arrow 424). Accordingly, the Epilog B 408 of Function B 404 may move the data in Stack 1 to Register X (non-volatile). When a break point is reached by the debugger, the state of the program is locked until execution of the process begins again. As such, if the debugger attempts to access non-volatile register values for Function A 410 it will access incorrect values. This may cause the debugger issues resulting in lost time and efficiency. Aspects disclosed herein, however, recreate the state of the program being debugged in an emulation system. The unwinding described above using Epilog B 408 may then be performed by the emulation system to return the correct values to the non-volatile registers. These values from the non-volatile registers may then be read by the debugger, thereby returning the correct non-volatile data for Function A without changing the state of the program being debugged.

As should be appreciated, the various aspects described with respect to FIG. 4 are not intended to limit the systems and methods to the particular components described. Accordingly, additional configurations may be used to practice the methods and systems herein and/or some components described may be excluded without departing from the methods and systems disclosed herein.

Figure 5:
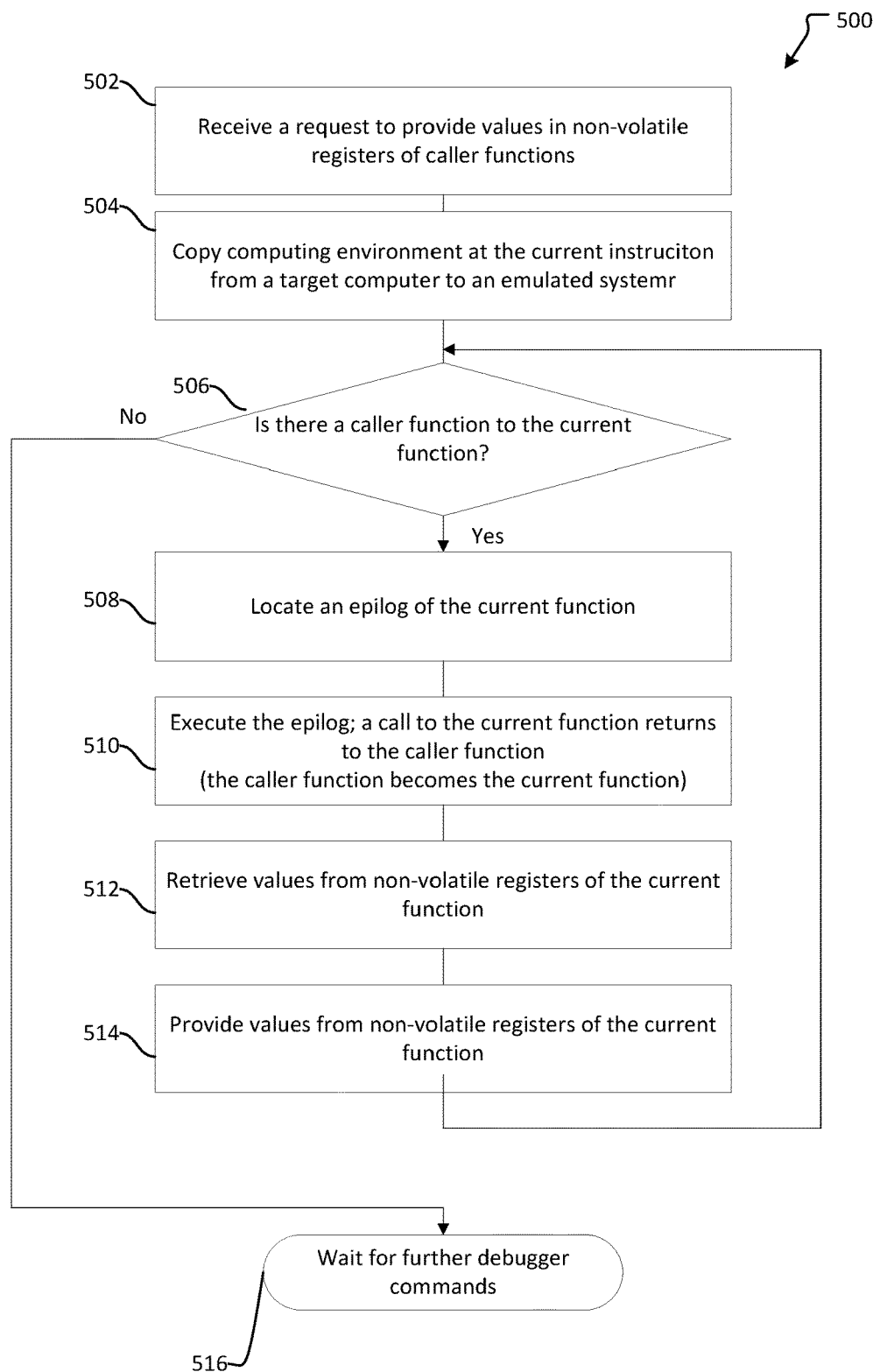
FIG. 5 illustrates a method of retrieving data for caller functions by emulating epilog.

FIG. 5 illustrates a method of retrieving data for caller functions by emulating epilog. In particular, some aspects of the present disclosure may retrieve data values that are originally stored by respective functions in a caller hierarchy. At receive operation 502, a request to provide values that caller functions have stored in in non-volatile registers may be received by the debugger. Such requests may target a specific set of one or more caller functions in hierarchy or all of the caller functions in the calling hierarchy relative to a current function. The current function is the function that was executing at the time of the request for suspending execution or at breakpoint.

At copy operation 504, computing environment at the current instruction code at a target computer may be copied to an emulated system. For instance, the target computer may correspond to a target system 170 of FIG. 1B and the emulated system may correspond to an emulated system 172 of FIG. 1B.

At a determine operation 506, the current function may be examined to identify if there is a caller function to the current function. At the time the copy operation 504 is performed, the current function may be the function that was executing on the target computer when a break point is reached. In some aspects, the caller function to the current function may be determined by searching through the program instruction code of the current function. For instance, an epilog section of the current function may indicate an address where the current function may return to. Additionally or alternatively, symbols used in program code for the current function may be searched based on symbols to retrieve information about its caller function such as addresses as well as a symbol name related to the caller function. In other instances, information about the caller function may be retrieved from the underlying operations system without requiring symbols by identifying references made within the program instruction code, as some ABI may require compilers to identify the stack unwinding prolog and epilog function sections.

If there is a caller function for the current function, flow branches YES to at locate operation 508, an epilog of the current function may be located. In some aspects, there may be more than one epilog in the instruction code of the current function. In such a situation, one epilog may be selected based on the instruction code related to a particular section such as a try-catch block where the break point may be associated with.

At an execute operation 510, the epilog may be executed by the emulated system. As previously discussed, epilog may restore values in non-volatile registers for the caller function. At operation 510, the caller function may be designated as the current function in continuing the method.

At a retrieve operation 512, values from the non-volatile registers of the current function may be retrieved from the emulated system. The values that the caller function has stored in non-volatile registers before calling the function may be useful to analyze issues from the perspective of processing the caller function.

At a provide operation 514, values from the non-volatile registers of the current function may be provided for further analysis. The investigation of values in non-volatile registers may require values that a function that called the caller function in the calling hierarchy.

In some aspects of the present disclosure, retrievals of values that a caller function stored prior to calling a callee function in non-volatile registers may continue iteratively through a function call hierarchy. For instance, after the provide operation 514, the method proceeds to the determine operation 506 to locate and execute a series of epilogs of respective callee functions until the top of the call hierarchy is reached. When there are no further caller functions, then flow branches NO from operation 506 to operation 516 where the method 500 waits for additional debugger commands. Alternatively, the method 500 may terminate at operation 516. While not shown in the figure, in some other aspects, the method may proceed to the copy operation 504 to copy data associated with computing environment to the emulated system to selectively emulate a part of one or more functions as specified by the debugger to retrieve values of non-volatile registers that its caller function has stored before calling the specified function. In some aspects, the copy operation 504 may make a full copy of the target computing environment. In some other aspects, the copy operation 504 may make a copy of only some parts of the computing environment which are sufficient to emulate the behavior of the functions being emulated. For instance, a full copy of the computing environment may be made upon copying the target computing environment for the first time. An emulator may record all values written by the emulated functions, and subsequently use the recorded values when read operations require the values. In some aspects, the emulated system emulates a limited set of instructions that are valid according to the prolog and epilog section of the specified function. As such, aspects disclosed herein may utilize a limited emulator and do not require an emulator with the capability to emulate the full functionality of a specified function. In some aspects, the emulated system with the limited set of emulated instructions may provide features that are sufficient for the limited emulation. For instance, in some instances, the emulated system may provide values of local variables in the function code, without maintaining states of the stack pointer to recover data saved in the stack.

As should be appreciated, operations 502-516 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

In some examples, an ABI in some execution environment may lack a functionality to support prologs and epilogs, from which some aspects of the present disclosure benefit. In some other aspects of the present disclosure, values that have been stored by caller functions in non-volatile registers before calling callee functions may be retrieved without use of prologs and epilogs, but by selectively emulating specific parts of callee functions caller functions in the emulated system.

In some aspects of the present disclosure, instruction code segments for prologs and epilogs may be absent in an instruction code of a function. For instance, some ABI for particular processors may not support features of prolog and epilog. Some compilers may lack a feature of generating and inserting prologs and epilogs to instruction code during compilation of program code. Moreover, particular types of functions such as leaf functions, which typically do not call any function within the functions, may not contain prologs and epilogs. In other aspects, invocation of leaf functions may be made from a recursive function as the current function. The termination of the recurrence may be determined based upon satisfying conditions through the emulation of a recursive function. In some aspects of the current disclosure, data that are stored by a calling function before calling its callee function in non-volatile registers may be retrieved by executing the current, callee function from the breakpoint forward until the callee function returns in the debug environment, by skipping or removing any functions that the callee function would otherwise call during the execution, and preventing any call kernel calls, such as read command for file operation. Upon executing until the end of the callee function, data that was stored in non-volatile registers may be restored. In some aspects, calling conventions, as determined by a compiler, may require that a caller function puts parameters and the caller removes the parameters upon calling a function. In order for the emulator to emulate the program instruction code forward without calling any function, the emulation may execute only the part that removes parameters from the memory stack. In some aspects, program instruction code may be analyzed based on one or more statistical analyses to locate return instructions from a callee function to a caller function, as well as to locate parameters to remove from the memory stack. In some aspects, a code flow analysis may be used to locate the return instructions in the callee function, based on a structure of the code of the function. During the code flow analysis, valid paths of the function may be determined. Examining the valid path of the function may be used to identify the code that restores registers before returning control to a caller function. The statistical analyses may be used when some issues prevents or makes non-desirable (e.g., costs too much) use of the code flow analysis. The issues may include but not limited to complexity in a structure of the function preventing the code flow analysis from successfully locating the required code. Additionally or alternatively the parameters to remove from the stack may be located via search based on symbols such as a name of function.

In some aspects, the emulated system may select one of multiple valid paths of the code flow through the function to execute the code flow analysis, in order to determine a section of the code which restores values of the registers before returning. Requiring such a partial code flow analysis may be effective because respective valid paths eventually have the section of the code to restore the values in the registers before returning to its caller function.

In some aspects, the emulated system may emulate sections of code associated with exception handling in a hierarchy of functions to determine the path to unwind the memory stack efficiently. The emulated system may emulate the sections of code for the purpose of unwinding the memory stack to restore the values in the registers even though such an exception has not occurred based on the behavior of the function. The use of code related to exception handling may effectively reduce a number of functions to emulate in order to restore value of the registers, because some exception handling code may remove functions needed to emulate depending on an overall structure of the program code.

Figure 6:
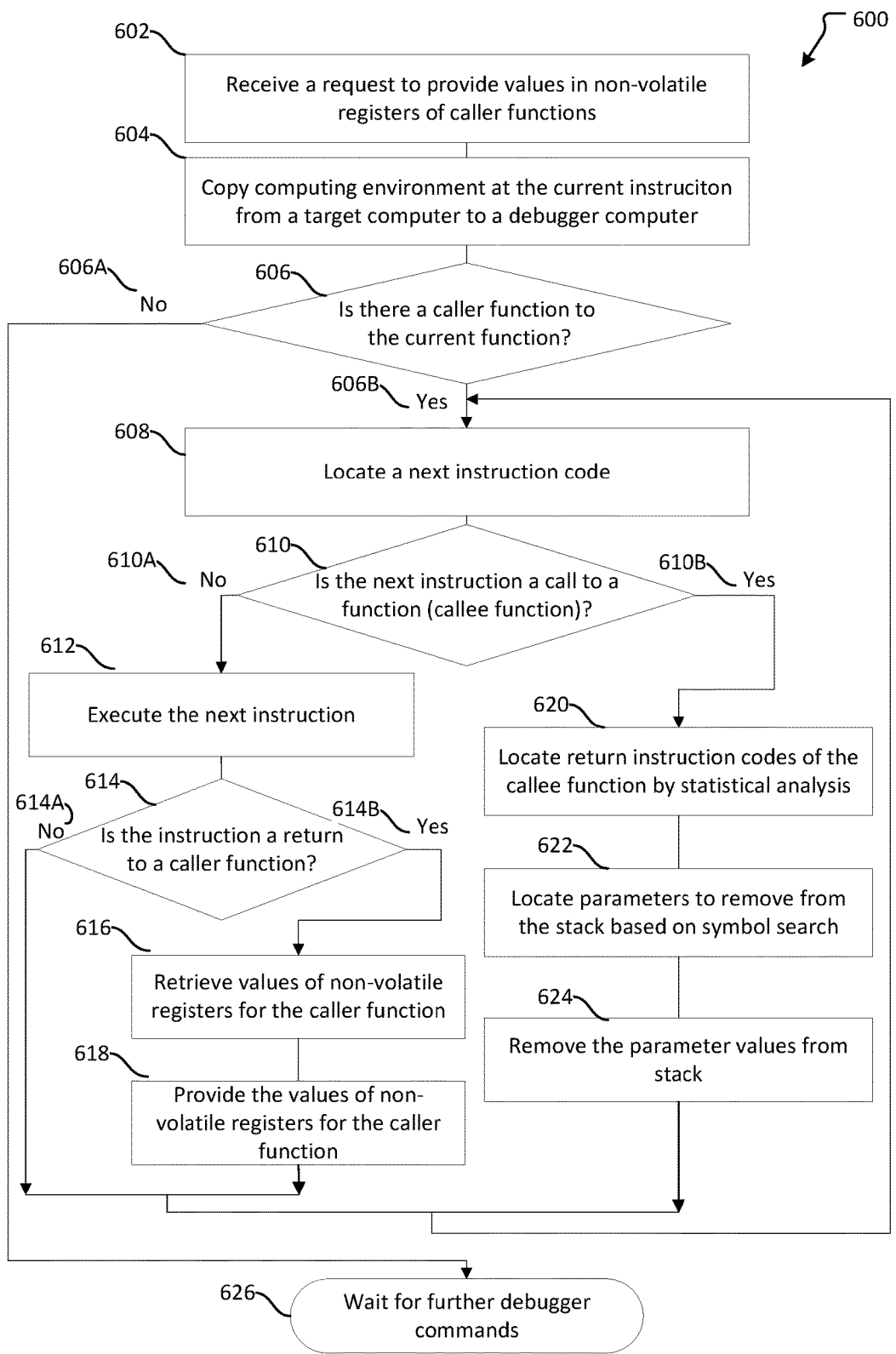
FIG. 6 illustrates a method of retrieving data for caller functions in the absence of epilog.

FIG. 6 illustrates a method of retrieving data for caller functions in the absence of epilog. In particular, according to the method 600, program instruction code of the current function may be executed from the break point until returning to the caller function without calling any further function from the current function. At receive operation 602, a request to provide values in non-volatile registers of caller functions may be received. Such values may be the value that the caller function stored before making the callee function, while requiring that the values in the non-volatile registers be retained between the time that the caller function calls the callee function and the time that the callee function returns to the caller function.

In a copy operation 604, a computing environment from a target system to an emulation system may be copied at the time that a program code is stopped by the debugger. Use of the copy in the emulated system may prevent from inadvertently altering data in the target computer during debugging. Emulating program instruction code in the emulated system may enable repeating the emulations as necessary by copying the computing environment again from the target computer. For instance, the target computer may correspond to a target system 170 of FIG. 1B and the emulated system may correspond to an emulated system 172 of FIG. 1B.

In a determine operation 606, a determination may be made whether there is a caller function to the current function. Initially the current function may be the function where a breakpoint exists and the program code is stopped. A caller function may be a function that has called the current function.

If there is a caller function to the current function 606B, the current function may continue to be executed until it returns to the caller function, but without calling any function from the current function. If not (606), the method waits for further debugger commands 626.

In a locate operation 608, a next instruction code within the current function may be located. In some aspects, program instruction code may be executed until the end of the return from the current function, without calling further downstream functions.

In a determine operation 610, a determination may be made if the next instruction is a call to a function (i.e., a callee function) downstream. If there is a new function call flow branches Yes (610B), then the execution proceeds without making an actual call to the function. If the next program instruction code indicate making a call to a function, then the emulation may be done such that the very end of the function is created.

In locate operation 620, return instruction code of the callee function may be located based on a statistical analysis on the instruction code. There may be specific patterns in instruction code to enable identifying one or more segments of program instruction code as a return code. In some aspects, the return instruction code of the callee function may be determined based on instruction code of the caller function. For instance, a call instruction may push data to the memory stack, and the data in the memory stack may be popped to restore data in the registers. Other instructions such as, but not limited, to a branch instruction may be used for the analysis as well. Additionally or alternatively, the analysis may consider other calling conventions. For instance, a link register (LR) may be used by some computing environment to call a function. The emulated system may adjust the analysis of different types of computing environments where functions are being emulated.

In some aspects, the emulated system may perform a statistical analysis based on the caller function. The statistical analysis may cover various scenarios in which the caller function invokes the callee functions. For instance, if the caller function does not push data to the memory stack, then it may be statistically likely that the callee function will not remove data from the memory stack before returning to the caller function in order to restore data in the registers. Alternatively, if the caller function pushes data to the memory stack, the emulated system may statistically determine that the callee function will retrieve the data from the data stack prior to returning to the caller function. The determinations made as needed based on the statistical analysis may be validated by emulating the code with a breakpoint set at the point on the return address, and by examining values of data in the non-volatile registers.

In some aspects, the emulated system may accommodate situations where the callee function may call a separate function that eventually returns to the caller function by indirectly jumping to an address as determined by some conditions set by the separate function in the computing environment. Such an indirect jump may prevent the emulated system from determining the section of instruction code for the return to the caller function, because the emulated system may prevent itself from calling the other function from the current function because the other function is outside the scope of the emulation. Furthermore, the emulated system may not have data needed to determine the correct address information at the indirect jump. In order to circumvent this issue, the emulator may pop the data from the memory stack according to the caller function based on a statistical likelihood that the data may be correctly popped from the memory stack. In some aspects, the same sequence of popping data from the caller function may be applied regardless of a number of return points that the callee function may have. In some aspects, the emulated system may validate results of the statistical analysis through examining the data in the non-volatile registers at the caller function.

In a locate operation 622, parameters to be removed from the stack may be located based on a symbol search. Program instruction code with symbols such as a name of parameters and variable symbols may be used to locate parameters that need to be removed upon the end of the function call.

In a remove operation 624, the parameters values may be removed from the stack of the emulated computing system where the call has returned to the current function. This way, the current function may continue to be emulated by executing forward in its program instruction code, but without actually making calls to further downstream functions.

If the determine operation 610 indicates that the next instruction is not a call to a function flow branches no (610A) and, in some aspects, the next instruction may be executed. In execute operation 612, the next instruction may be executed.

In an execute operation 612, the next instruction may be executed. Values of data in registry and memory stack may be changed during the execution of the next instruction, according to the compiled program instruction code.

In a determine operation 614, whether the current instruction is a return instruction code to a caller function may be determined. The return to a caller function may indicate the end of the current function (614A). If the instruction is a return instruction code to a caller function, then the end of the current function has been reached and the values of non-volatile registers may be retrieved for a caller function (614B). In some aspects the determine operation 614, including examining the instruction code may take place in the emulated system. The target system may be frozen and executions may be halted throughout the emulation and debugging.

In a retrieve operation 616, values of non-volatile registers may be retrieved for the caller function. The values for the non-volatile registers may be used for emulating the caller function. For instance, values of data that the caller function had in volatile registers may be generated through emulating the caller function. In addition, processing by the caller function before calling the callee function may be emulated to analyze processing of the caller function as the caller function calls the callee function.

In a provide operation 618, the values of non-volatile registers for the caller function may be provided based on data retrieved in the retrieve operation 616. In some aspects, the values may be provide to a display device for display to developers and integrators. In some other aspects, the values may be sent to a debugger application program for further analysis of the program code execution.

In some aspects, values that a caller has set in non-volatile registers before calling functions may be retrieved by emulating the current function in the emulated system instead of emulating an epilog. Such emulation of the current function, however may be carefully monitored to prevent the current function from calling other functions. When there is program instruction code that makes a call to a function, in some aspects, the function is not called. Instead, the function's return process may be emulated by removing input parameters to the function.

As should be appreciated, operations 602-626 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

In some aspects, the program code may be stopped by the debugger at a point where a prolog section of the callee function program instruction code may be executed. In such circumstances, there may be rules to identify exactly which program instruction code to emulate based on the prolog to unwind the sequence of preparing for starting the callee function. Such a sequence, in some aspects a reversed sequence of processing instruction code of the prolog, may be emulated to retrieve values in the non-volatile registers for which the caller function stored before calling the callee function. In some aspects, the debugger may emulate a section of the epilog as selected by the debugger based on the point where the program code may was stopped within the prolog. The epilog code may mirror handling of data between the memory stack and the non-volatile registers as the callee function preserves data that is stored in the non-volatile registers before the body of callee function is executed. In examples, the body of the callee function may be the function minus the prolog and epilog. Accordingly, the prolog may contain read operations on the non-volatile registers while the epilog may modify values of the non-volatile registers.

In some aspects, a debugging environment may provide a feature where at least one break point may be set to a program instruction code, and enables the debugger to traverse forward and backward in a spatial perspective from the break point in the current function. Such a debugger may provide a time travel tracing feature. In moving forward spatially from the breakpoint in the debugging environment, values of non-volatile registers for a caller function may be retrieved and be provided by locating a section of program instruction code in the callee function to return to the caller function. Then parameters may be retrieved from the memory to emulate the return from the callee function in the caller function, thereby fast-forwarding the emulating from the spatial perspective.

Figure 7:
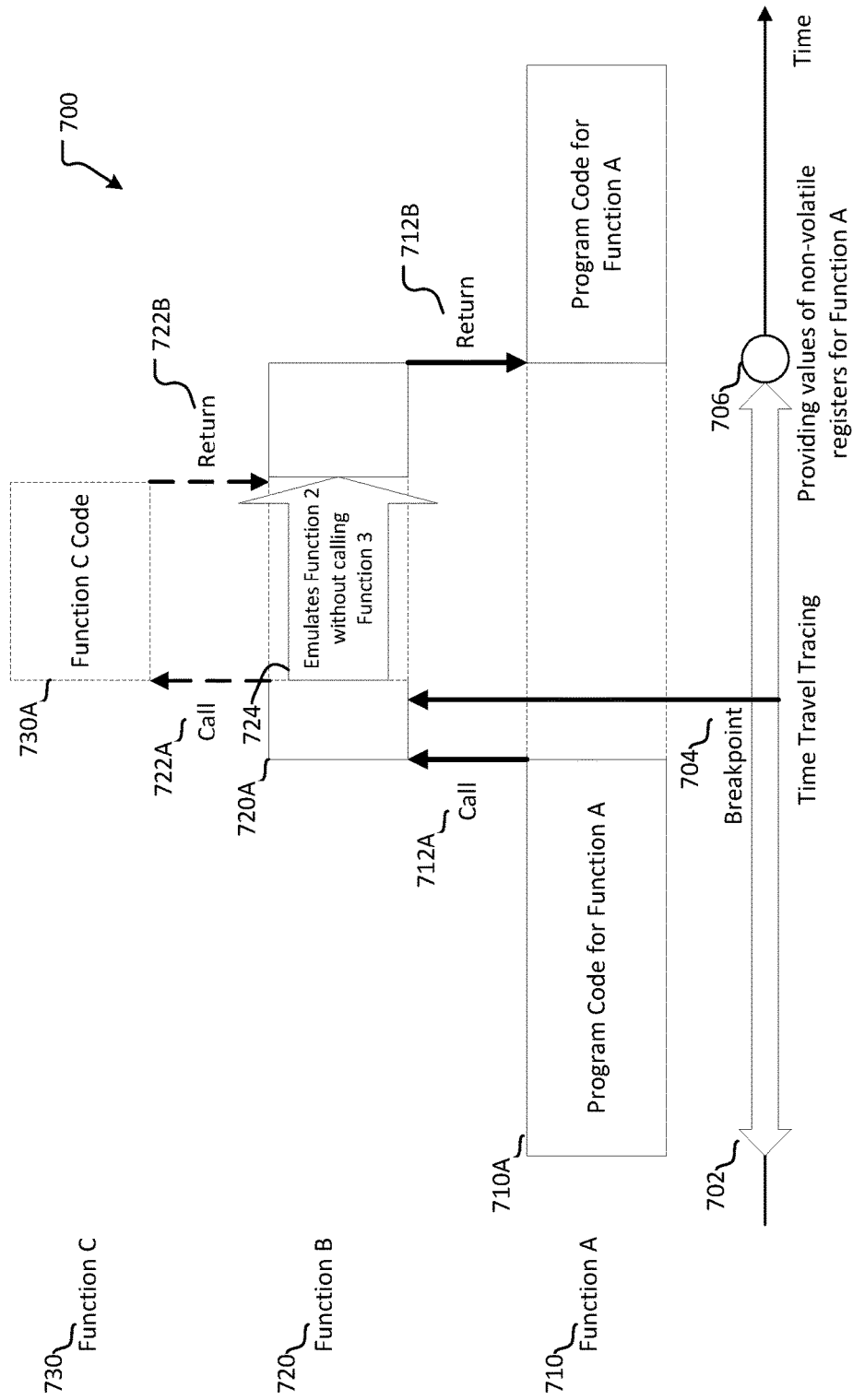
FIG. 7 illustrates an example of retrieving data for a caller function by emulating a callee function.

FIG. 7 illustrates an example of retrieving data for a caller function by emulating a callee function during time travel tracing. According to the example, there may be three functions, Function A 710, Function B 720 and Function C 730. The figure has time sequence in a horizontal direction, as depicted by the solid arrow. Time Travel Tracing 702 may enable moving forward and backward in the spatial standpoint in program code execution from the Breakpoint 704. For instance, Function A 710 may be executed first based on the Program Code 710A for Function A 710. Function A 710 makes a function call 712A to Function B 720 at a program instruction code 714A. Then, program code 720A for Function B are executed. The breakpoint 704 has been set within the program code 720A of Function B 720. The example shows that the debugger environment has been initially stopped at the breakpoint 704 inside the Function B 720. It is assumed here that prologs or epilogs are not provided, thus the current function, Function B 720 in this example, may be executed to the point of returning 722B to the caller function, Function A 710, without making a function call 722A to another function at point 724. After continuing emulation of the program instruction code of Function B 720 until its return 712B to Function A 710, values of non-volatile registers for Function A may be retrieved based on the method as described in FIG. 6. The values for nonvolatile registers for Function A 710 may be provided 706. This way, the emulated system may be capable of moving forward and moving back with a reference at the Breakpoint 704 to provide values on of non-volatile registers of Function A at points as specified by the emulated system. In some aspects, the emulated system may provide data when the time is set back to the time at the Breakpoint 704, without indication that code beyond the Breakpoint 704 has been emulated during the "fast-forward" in time before the time was moved back to the Breakpoint 704.

As should be appreciated, the various methods, devices, components, etc., described with respect to FIG. 7 are not intended to limit the systems and methods to the particular components described. Accordingly, additional processes may be used to practice the methods and systems herein and/or some components described may be excluded without departing from the methods and systems disclosed herein.

As an example of a processing device operating environment, refer to the exemplary operating environments depicted in FIGS. 8-11. In other instances, the components of systems disclosed herein may be distributed across and executable by multiple devices. For example, input may be entered on a client device and information may be processed or accessed from other devices in a network (e.g. server devices, network appliances, other client devices, etc.).

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
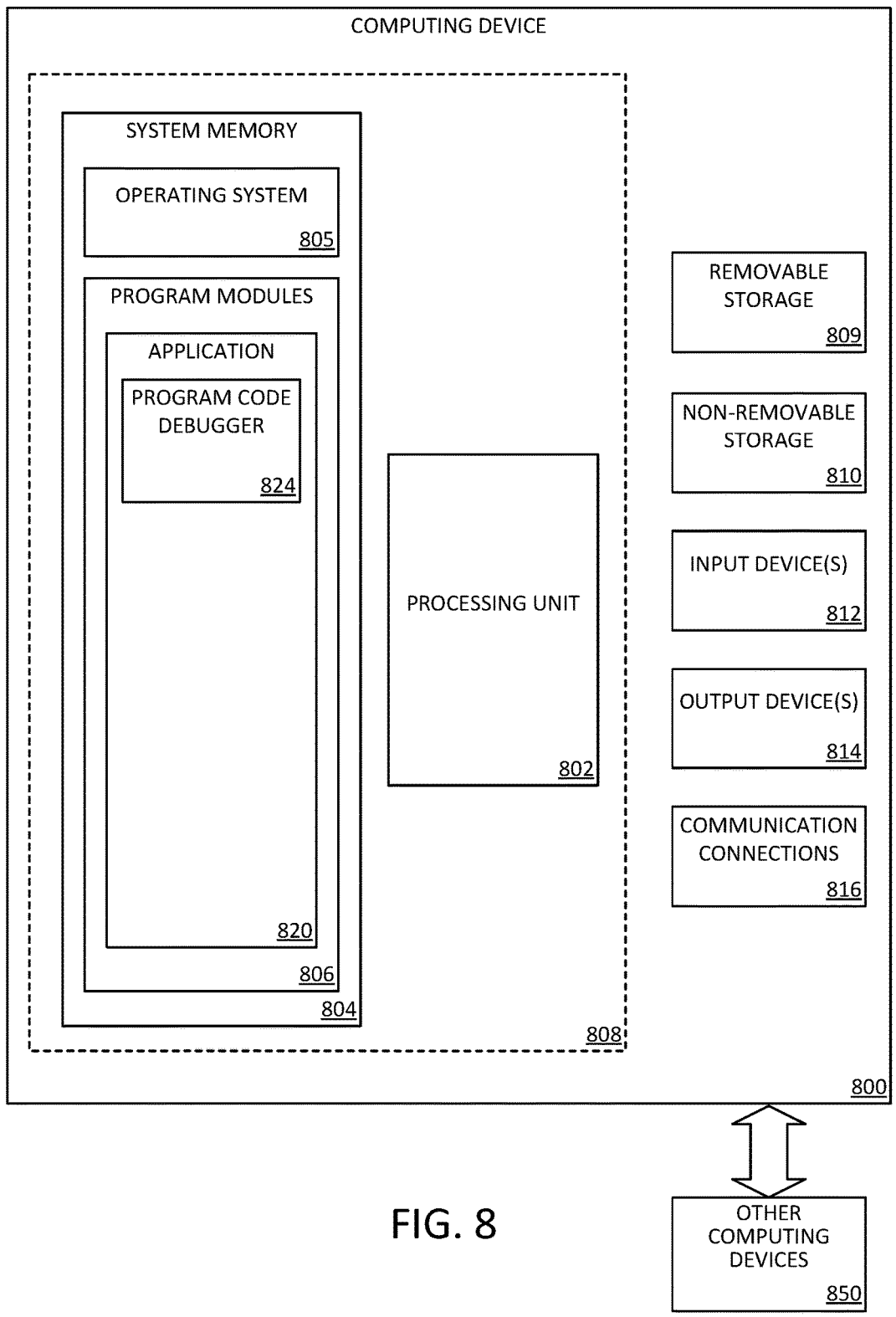
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as a program code debugger 824. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
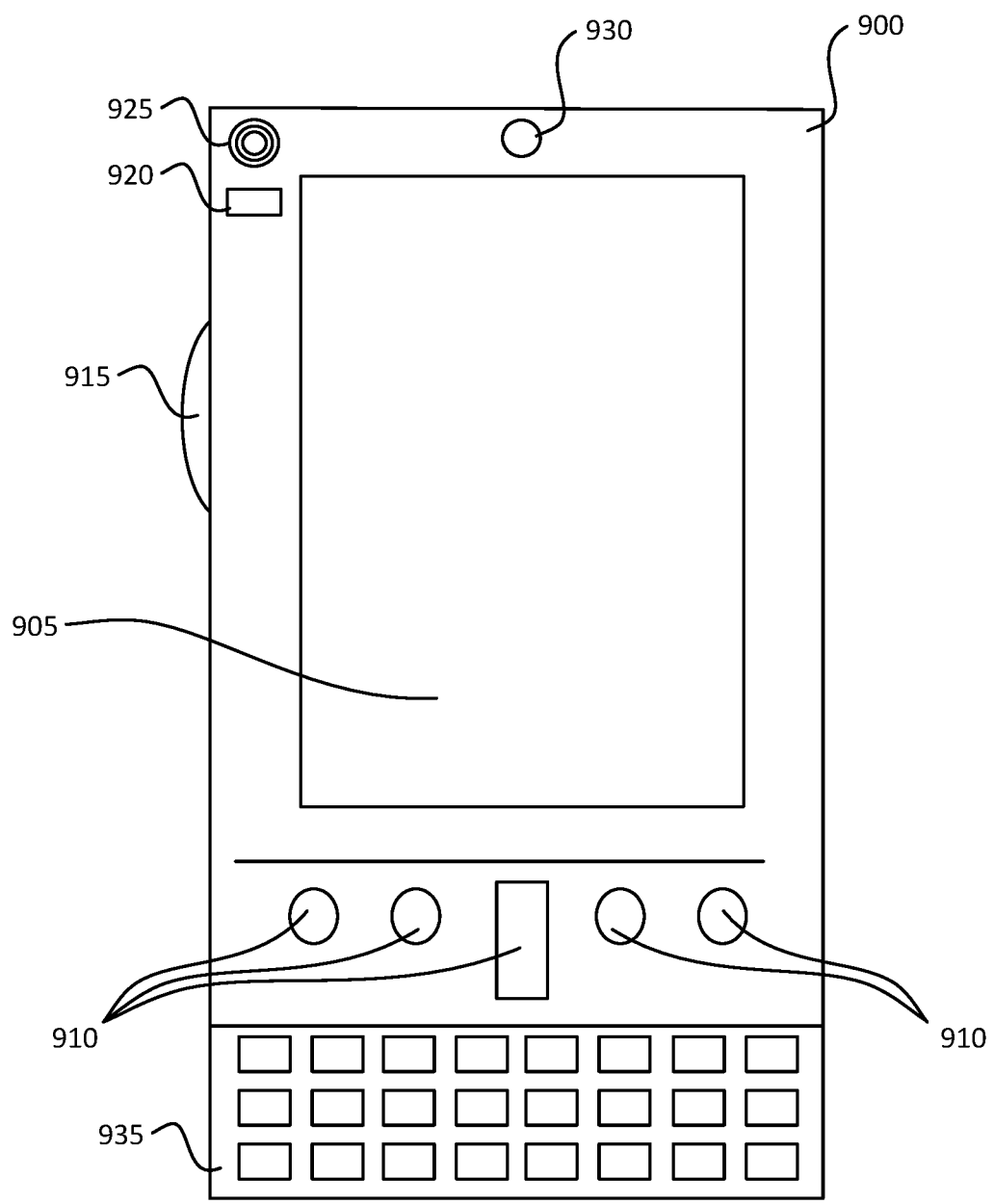
FIGS. 9A and 9B are simplified block diagrams of a mobile computing device with which aspects of the present disclosure may be practiced.
Figure 9B:
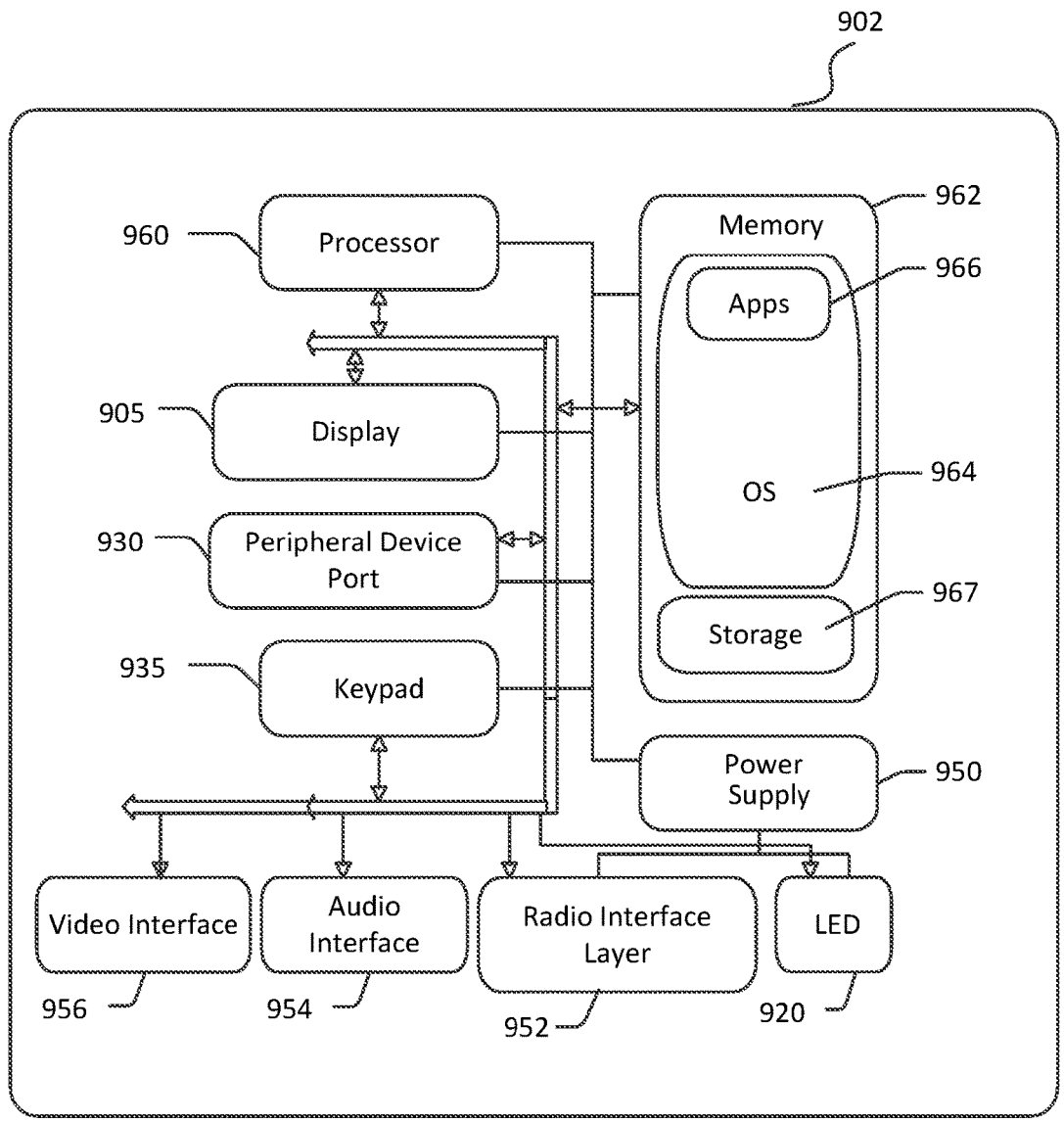

FIGS. 9A and 9B illustrate a mobile computing device 900, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some embodiments. In yet another alternative embodiment, the mobile computing device 900 is a portable phone system, such as a cellular phone. The mobile computing device 900 may also include an optional keypad 935. Optional keypad 935 may be a physical keypad or a "soft" keypad generated on the touch screen display. In various embodiments, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In one embodiment, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 967 within the memory 962. The non-volatile storage area 967 may be used to store persistent information that should not be lost if the system 902 is powered down. The application programs 966 may use and store information in the non-volatile storage area 967, such as e-mail or other messages used by an e-mail application, and the like. A synchronization application (not shown) also resides on the system 902 and is programmed to interact with a corresponding synchronization application resident on a host computer to keep the information stored in the non-volatile storage area 967 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 950, which may be implemented as one or more batteries. The power supply 950 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 954 may be used for producing audible notifications via the audio transducer 925. In the illustrated embodiment, the visual indicator 920 is a light emitting diode (LED) and the audio transducer 925 is a speaker. These devices may be directly coupled to the power supply 950 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 954 is used to provide audible signals to and receive audible signals from the user. For example, in addition to being coupled to the audio transducer 925, the audio interface 954 may also be coupled to a microphone to receive audible input, such as to facilitate a telephone conversation. In accordance with embodiments of the present disclosure, the microphone may also serve as an audio sensor to facilitate control of notifications, as will be described below. The system 902 may further include a video interface 956 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
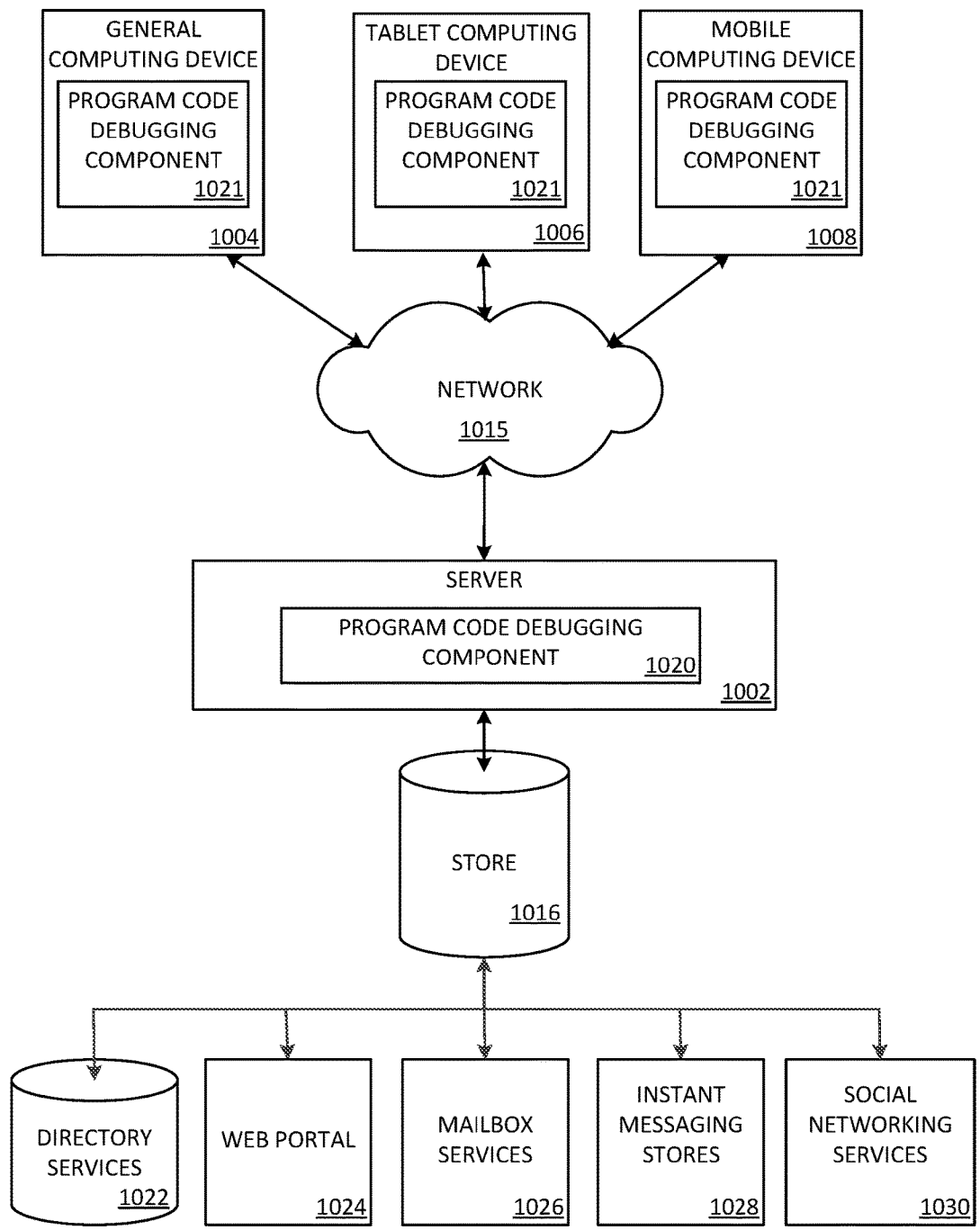
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1022, a web portal 1024, a mailbox service 1026, an instant messaging store 1028, or a social networking site 1030. Program code debugging environment 1021 may be employed by a client that communicates with server device 1002, and/or program code debugging component 1020 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these embodiments of the computing devices may obtain content from the store 1016, in addition to receiving graphical data usable to be either pre-processed at a graphic-originating system, or post-processed at a receiving computing system.

Figure 11:
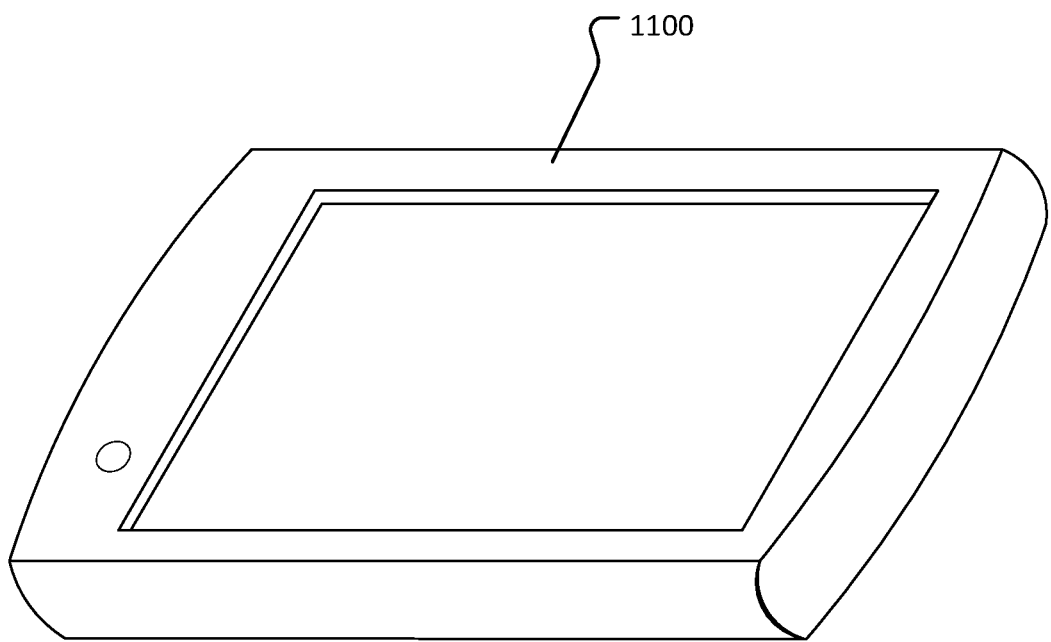
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, implemented at a computer system that includes one or more processors, for debugging executable code, the method comprising:
   executing the executable code within a target computing environment;
   stopping execution of the executable code within the target computing environment at a current function;
   locating an instruction code segment of the current function wherein the instruction code segment is an epilog of the current function;
   copying a snapshot of the target computing environment to an emulation computing environment, the snapshot including a set of data related to executing the executable code within the target computing environment;
   emulating the instruction code segment within the emulation computing environment while maintaining state of the executable code within the target computing environment;
   after emulating the instruction code segment within the emulation computing environment, retrieving at least one value of a non-volatile register for a caller function of the current function, wherein the instruction code segment modifies the at least one value of the non-volatile register; and
   based on the retrieved at least one value of the non-volatile register for the caller function, emulating one or more executable code instructions of the caller function within the emulation computing environment.

2. The computer-implemented method of claim 1, further comprising:
   determining a set functions in a hierarchy of caller functions based on the current function;
   determining at a set of one or more instruction code segments from the set of functions;
   iteratively emulating the one or more instruction code segments; and
   based upon the iterative emulation, providing at least one additional value for one or more non-volatile registers.

3. The computer-implemented method of claim 1, wherein the epilog restores non-volatile registers for a caller function.

4. The computer-implemented method of claim 1, wherein the method further comprises:
   identifying a call to a callee function by the current function;
   determining a return instruction code for the callee function as the instruction code; and
   after emulating the instruction code segment, retrieving at least one value of non-volatile registers for the caller function of the current function.

5. The computer-implemented method of claim 4, wherein determining the return instruction code for the callee function further comprises:
   determining at least one code in the caller function, wherein the at least one code calls the callee function;
   based on the at least one code, determine one or more parameters stored in a memory stack before calling the callee function; and
   based on statistical information, remove the one or more parameters from the memory stack.

6. The computer-implemented method of claim 1, wherein the instruction code segment is at least in part a prolog of the break function in a reverse sequence of instructions.

7. The computer-implemented method of claim 1, wherein the instruction code segment is at least a part of the current function when the current function is a leaf function, and wherein the leaf function is a function without a call instruction to another function.

8. The computer-implemented method of claim 1, wherein emulating the one or more executable code instructions of the caller function within the emulation computing environment includes at least one of:
   generating at least one value stored in a register; or
   generating at least one value stored in memory.

9. A computing device, comprising:
   at least one processing unit; and at least one memory storing computer executable instructions for debugging program code at instruction level, the instructions when executed by the at least one processing unit causing the computing device to:
  execute the executable code within a target computing environment;
  stop execution of the executable code within the target computing environment at a current function;
  locate an instruction code segment of the current function, wherein the instruction code segment is an epilog of the current function;
  copy a snapshot of the target computing environment to an emulation computing environment, the snapshot including a set of data related to executing the executable code within the target computing environment;
  emulate the instruction code segment within the emulation computing environment while maintaining state of the executable code within the target computing environment;
  after emulating the instruction code segment within the emulation computing environment, retrieve at least one value of a non-volatile register for a caller function of the current function, wherein the instruction code segment modifies the at least one value of the non-volatile register; and
  based on the retrieved at least one value of the non-volatile register for the caller function, emulate one or more executable code instructions of the caller function within the emulation computing environment.

10. The computing device of claim 9, the instructions further causing the computing device to:
  determine a set functions in a hierarchy of caller functions based on the current function;
  determine at a set of one or more instruction code segments from the set of functions;
  iteratively emulate the one or more instruction code segments; and
  based upon the iterative emulation, provide at least one addition value for one or more non-volatile registers.

11. The computing device of claim 9, wherein the epilog restores non-volatile registers for a caller function.

12. The computing device of claim 9, wherein the instruction code segment is at least one program instruction code of the break function, the instructions further causing the computing device to:
  identify a call to a callee function by the current function;
  determine a return instruction code for the callee function as the instruction code; and
  after emulating the instruction code segment, retrieve at least one value of non-volatile registers for the caller function of the current function.

13. The computing device of claim 12, the instruction to determine the return instruction code for the callee function further causing the computing device to:
  determine at least one code in the caller function, wherein the at least one code calls the callee function;
  based on the at least one code, determine one or more parameters stored in a memory stack before calling the callee function; and
  based on statistical information, remove the one or more parameters from the memory stack.

14. The computing device of claim 9, wherein the instruction code segment is at least in part of a prolog of the break function in a reverse sequence of instructions.

15. The computing device of claim 9, wherein emulating the one or more executable code instructions of the caller function within the emulation computing environment includes at least one of:
  generating at least one value stored in a register; or
  generating at least one value stored in memory.

16. A computer storage device storing computer executable instructions for debugging program code at instruction level, the instructions when executed by at least one processing unit, cause the at least one processing unit to:
  execute the program code within a target computing environment;
  stop execution of the program code within the target computing environment at a current function;
  locate an instruction code segment of the current function, wherein the instruction code segment is an epilog of the current function;
  copy a snapshot of the target computing environment to an emulation computing environment, the snapshot including a set of data related to executing the executable code within the target computing environment;
  emulate the instruction code segment within the emulation computing environment while maintaining state of the executable code within the target computing environment;
  after emulating the instruction code segment within the emulation computing environment, retrieve at least one value of a non-volatile register for a caller function of the current function, wherein the instruction code segment modifies the at least one value of the non-volatile register; and
  based on the retrieved at least one value of the non-volatile register for the caller function, emulate one or more executable code instructions of the caller function within the emulation computing environment.

17. The computer storage device of claim 16, wherein the epilog restores non-volatile registers for a caller function.

18. The computer storage device of claim 16, wherein the instruction code segment is at least one program instruction code of a break function, the instructions further causing the computing device to:
  identify a call to a callee function by the current function;
  determine a return instruction code for the callee function as the instruction code; and
  after emulating the instruction code segment, retrieve at least one value of non-volatile registers for the caller function of the current function.

19. The computer storage device of claim 18, the instruction to determine the return instruction code for the callee function further causing the computing device to:
  determine at least one code in the caller function, wherein the at least one code calls the callee function;
  based on the at least one code, determine one or more parameters stored in a memory stack before calling the callee function; and
  based on statistical information, remove the one or more parameters from the memory stack.

20. The computer storage device of claim 16, wherein emulating the one or more executable code instructions of the caller function within the emulation computing environment includes at least one of:
  generating at least one value stored in a register; or
  generating at least one value stored in memory.

* * * * *